US010277468B2

(12) United States Patent
Gupta

(10) Patent No.: US 10,277,468 B2
(45) Date of Patent: Apr. 30, 2019

(54) METHOD AND SYSTEM FOR DETERMINING REACHABILITY BETWEEN ONE OR MORE NODES IN A GRAPH

(71) Applicant: Conduent Business Service, LLC, Dallas, TX (US)

(72) Inventor: Manoj Gupta, Bangalore (IN)

(73) Assignee: Conduent Business Service, LLC, Dallas, TX (US)

( * ) Notice: Subject to any disclaimer, the term of this patent is extended or adjusted under 35 U.S.C. 154(b) by 387 days.

(21) Appl. No.: 14/683,251

(22) Filed: Apr. 10, 2015

(65) Prior Publication Data

US 2016/0301574 A1  Oct. 13, 2016

(51) Int. Cl.
*H04L 12/24* (2006.01)
*G06F 17/30* (2006.01)

(52) U.S. Cl.
CPC ................ *H04L 41/12* (2013.01)

(58) Field of Classification Search
CPC ........................ H04L 41/12; G06F 17/30958
USPC ........................................................ 709/223
See application file for complete search history.

(56) References Cited

U.S. PATENT DOCUMENTS

| | | | |
|---|---|---|---|
| 6,704,320 B1 | 3/2004 | Naraez et al. | |
| 7,016,307 B2 | 3/2006 | Vasudev et al. | |
| 7,593,341 B1 | 9/2009 | Buriol et al. | |
| 7,668,971 B2 | 2/2010 | Vasseur et al. | |
| 2003/0165117 A1* | 9/2003 | Garcia-Luna-Aceves | H04L 45/02 370/238 |
| 2009/0296719 A1* | 12/2009 | Maier | H04L 45/12 370/400 |
| 2011/0112759 A1* | 5/2011 | Bast | G01C 21/3423 701/533 |
| 2014/0029610 A1* | 1/2014 | Vasseur | H04L 45/025 370/389 |
| 2014/0269410 A1* | 9/2014 | Shah | H04L 45/12 370/254 |

(Continued)

OTHER PUBLICATIONS

Pedro Domingos and Matt Richardson. Mining the network value of customers. KDD '01, pp. 57-66. ACM, 2001.

(Continued)

*Primary Examiner* — Ario Etienne
*Assistant Examiner* — Elizabeth Kassa
(74) *Attorney, Agent, or Firm* — Jones Robb, PLLC

(57) ABSTRACT

The disclosed embodiments illustrate methods and systems for maintaining reachability information among one or more communication devices of a communication network. The method includes creating, at a first time instance, a first path-union graph, between a first and a second communication device that become unreachable from each other in the communication network. Thereafter, a reachability tree is created from the first path-union graph. The reachability tree includes a set of communication devices that are at a distance of less than a predefined path distance from the first communication device. Further, at a second time instance, a second path-union graph is created between the first communication device and a third communication device, when the third communication device becomes unreachable from the first communication device. Thereafter, the reachability tree is updated based on the second path-union graph.

13 Claims, 7 Drawing Sheets

(56) References Cited

U.S. PATENT DOCUMENTS

| | | | | |
|---|---|---|---|---|
| 2014/0372498 A1* | 12/2014 | Mian | ................ | H04L 67/12 |
| | | | | 709/201 |
| 2015/0120713 A1* | 4/2015 | Kim | ................ | G06F 17/3053 |
| | | | | 707/723 |
| 2015/0120717 A1* | 4/2015 | Kim | ................ | G06F 17/30699 |
| | | | | 707/727 |
| 2015/0256401 A1* | 9/2015 | Zinger | ................ | H04L 41/14 |
| | | | | 370/401 |
| 2016/0071162 A1* | 3/2016 | Ogawa | ................ | G06Q 30/0269 |
| | | | | 705/14.66 |

OTHER PUBLICATIONS

Shimon Even and Yossi Shiloach. An on-line edge-deletion problem. J. ACM, 28(1):1-4, 1981.

Joachim Gudmundsson, Pat Morin, and Michiel H. M. Smid. Algorithms for marketing-mix optimization. CoRR, abs/0903.0308, 2009.

Monika Henzinger, Sebastian Krinninger, and Danupon Nanongkai. Sublinear-time decremental algorithms for single-source reachability and shortest paths on directed graphs. In Symposium on Theory of Computing, STOC 2014, New York, NY, USA, May 31-Jun. 3, 2014, pp. 674-683, 2014.

David Kempe, Jon Kleinberg, and Éva Tardos. Maximizing the spread of influence through a social network. KDD '03, 2003.

Youze Tang, Xiaokui Xiao, and Yanchen Shi. Influence maximization: Near-optimal time complexity meets practical efficiency. SIGMOD '14, pp. 75-86. ACM, 2014.

\* cited by examiner

METHOD AND SYSTEM FOR DETERMINING REACHABILITY BETWEEN ONE OR MORE NODES IN A GRAPH

TECHNICAL FIELD

The presently disclosed embodiments are related, in general, to graph processing. More particularly, the presently disclosed embodiments are related to methods and systems for determining reachability between one or more nodes in a graph.

BACKGROUND

Hierarchal data structures, such as graphs, may be useful for representing and processing information in a variety of application areas including, but not limited to, big data analytics, urban mobility, communication networks, and influence maximization in dynamic networks (e.g., social networks). For example, in case of a communication network, a graph data structure may be used to represent information related to connectivity between a set of communication devices in the communication network. Each communication device may be represented by a node in the graph. If a pair of communication devices are able to communicate with each other, they may be connected by an edge in the graph, and so on. The connectivity information maintained by such a graph may be used in various ways. For instance, the graph may be used to check whether two communication devices can communicate with each other. In addition, the graph may also be used to identify a shortest connectivity path between two communication devices, if the communication devices can communicate.

Under various circumstances, the information related to the various nodes represented in the graph may change frequently. Accordingly, due to the change in the information related to the underlying nodes, the graph may be updated. For instance, in case of the communication network, a communication link between one or more communication devices may snap. Further, certain communication devices may be switched off and hence be removed from the communication network. Under such circumstances, the edges representing the snapped communication link may be removed from the graph. Further, the node representing the switched off communication device may be removed from the graph. Thus, to identify a path between any two communication devices, the graph may be required to be processed again. However, this may lead to an increase in computational and time requirements. Hence, there is a need for methods and systems to efficiently process dynamically changing graphs.

SUMMARY

According to embodiments illustrated herein, there is provided a method for maintaining reachability information among one or more communication devices of a communication network. The method includes, in an application server, determining whether a first communication device is reachable from a second communication device and a third communication device in the communication network. Thereafter, at a first time instance, a first path-union graph is created between the first communication device and the second communication device, when the second communication device and the first communication device are unreachable in the communication network. Further, a reachability tree is created from the first path-union graph. The reachability tree is deterministic of a path distance between the first communication device and a set of communication devices in the communication network. The path distance is less than a predefined path distance, and the reachability tree is deterministic of the reachability information between the first communication device and the set of communication devices. Further, at a second time instance, a second path-union graph is created between the first communication device and the third communication device, when the third communication device is unreachable from the first communication device. Thereafter, the reachability tree is updated based on the second path-union graph.

According to embodiments illustrated herein, there is provided a method for maintaining reachability information among one or more locations associated with a transportation network of a geographical area. The method includes, in an application server, determining whether a first location is reachable from a second location and a third location in the transportation network. Thereafter, at a first time instance, a first path-union graph is created between the first location and the second location of the transportation network, when the second location and the first location are unreachable in the transportation network. Further, a reachability tree is created from the first path-union graph. The reachability tree is deterministic of a path distance between the first location and a set of locations in the transportation network. The path distance is less than a predefined path distance, and the reachability tree is deterministic of the reachability information between the first location and the set of locations. Further, at a second time instance, a second path-union graph is created between the first location and the third location of the transportation network, when the third location is unreachable from the first location. Thereafter, the reachability tree is updated based on the second path-union graph.

According to embodiments illustrated herein, there is provided an application server for maintaining reachability information among one or more communication devices of a communication network. The application server includes one or more processors configured to determine whether a first communication device is reachable from a second communication device and a third communication device in the communication network. Thereafter, at a first time instance, a first path-union graph is created between the first communication device and the second communication device, when the second communication device and the first communication device are unreachable in the communication network. Further, a reachability tree is created from the first path-union graph. The reachability tree is deterministic of a path distance between the first communication device and a set of communication devices in the communication network. The path distance is less than a predefined path distance, and the reachability tree is deterministic of the reachability information between the first communication device and the set of communication devices. Further, at a second time instance, a second path-union graph is created between the first communication device and the third communication device, when the third communication device is unreachable from the first communication device. Thereafter, the reachability tree is updated based on the second path-union graph.

According to embodiments illustrated herein, there is provided an application server for maintaining reachability information among one or more locations associated with a transportation network of a geographical area. The application server includes one or more processors configured to determine whether a first location is reachable from a second location and a third location in the transportation network. Thereafter, at a first time instance, a first path-union graph is created between the first location and the second location of the transportation network, when the second location and the first location are unreachable in the transportation network. Further, a reachability tree is created from the first path-union graph. The reachability tree is deterministic of a path distance between the first location and a set of locations in the transportation network. The path distance is less than a predefined path distance, and the reachability tree is deterministic of the reachability information between the first location and the set of locations. Further, at a second time instance, a second path-union graph is created between the first location and the third location of the transportation network, when the third location is unreachable from the first location. Thereafter, the reachability tree is updated based on the second path-union graph.

According to embodiments illustrated herein, there is provided a computer program product for use with an application server. The computer program product comprises a non-transitory computer readable medium storing a computer program code for maintaining reachability information among one or more communication devices of a communication network. The computer program code is executable by one or more processors in the application server to determine whether a first communication device is reachable from a second communication device and a third communication device in the communication network. Thereafter, at a first time instance, a first path-union graph is created between the first communication device and the second communication device, when the second communication device and the first communication device are unreachable in the communication network. Further, a reachability tree is created from the first path-union graph. The reachability tree is deterministic of a path distance between the first communication device and a set of communication devices in the communication network. The path distance is less than a predefined path distance, and the reachability tree is deterministic of the reachability information between the first communication device and the set of communication devices. Further, at a second time instance, a second path-union graph is created between the first communication device and the third communication device, when the third communication device is unreachable from the first communication device. Thereafter, the reachability tree is updated based on the second path-union graph.

According to embodiments illustrated herein, there is provided a computer program product for use with an application server. The computer program product comprises a non-transitory computer readable medium storing a computer program code for maintaining reachability information among one or more locations associated with a transportation network of a geographical area. The computer program code is executable by one or more processors in the application server to determine whether a first location is reachable from a second location and a third location in the transportation network. Thereafter, at a first time instance, a first path-union graph is created between the first location and the second location of the transportation network, when the second location and the first location are unreachable in the transportation network. Further, a reachability tree is created from the first path-union graph. The reachability tree is deterministic of a path distance between the first location and a set of locations in the transportation network. The path distance is less than a predefined path distance, and the reachability tree is deterministic of the reachability information between the first location and the set of locations.

Further, at a second time instance, a second path-union graph is created between the first location and the third location of the transportation network, when the third location is unreachable from the first location. Thereafter, the reachability tree is updated based on the second path-union graph.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
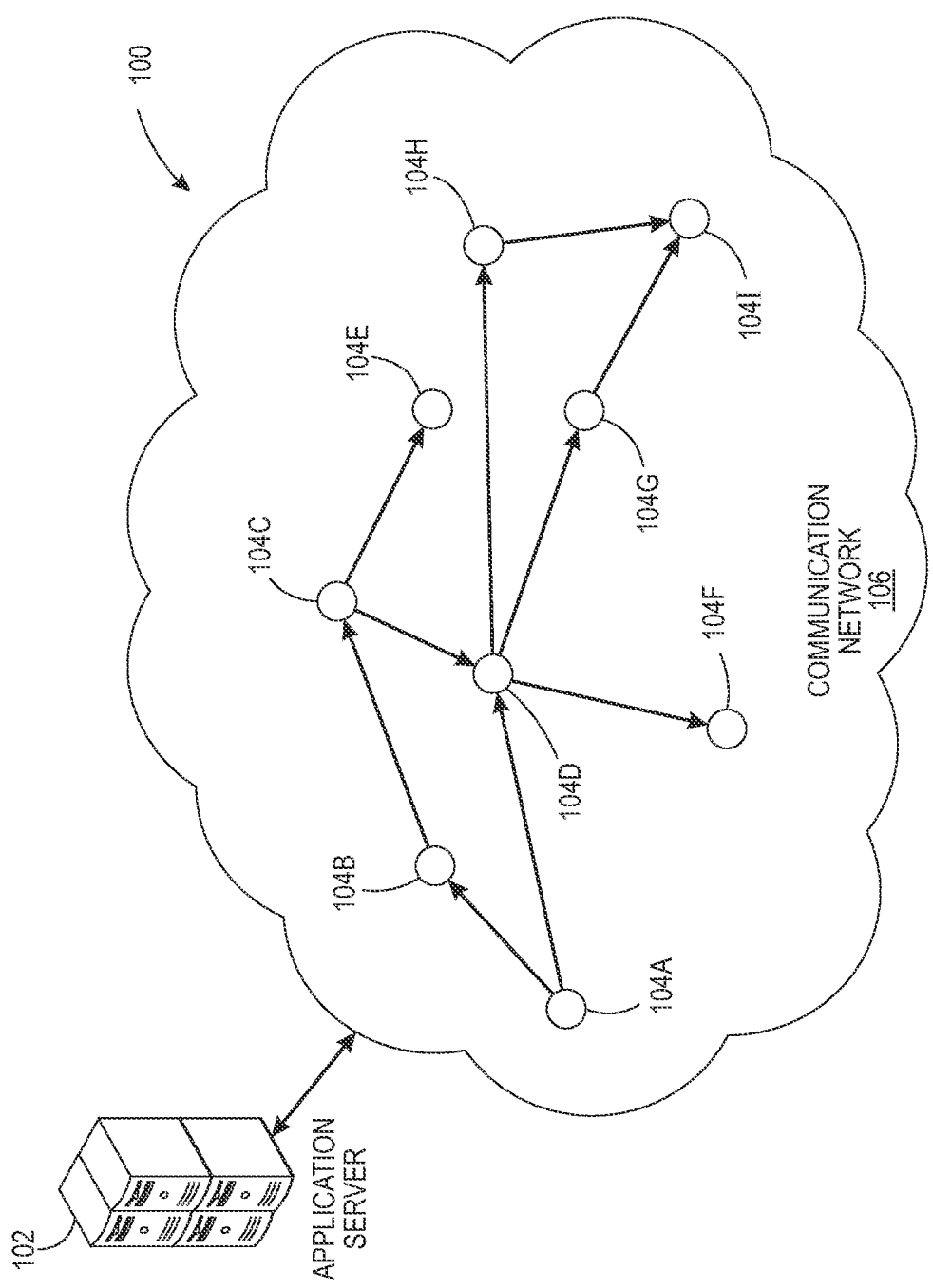
FIG. 1 is a block diagram of a system environment, in which various embodiments can be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below.

A "connectivity graph" refers to a graph representing a connectivity relationship among one or more nodes. In an embodiment, the one or more nodes of the connectivity graph may correspond to one or more communication devices of a communication network. In such a scenario, the connectivity graph may maintain connectivity information pertaining to the one or more communication devices. In another embodiment, the one or more nodes of the connectivity graph may correspond to one or more locations in a transportation network and the connectivity graph may maintain connectivity information pertaining to the one or more locations.

A "communication device" refers to a computing device including one or more processors, one or more memories, and one or more transceivers. The one or more memories may include computer readable code that is executable by the one or more processors to perform predetermined operations. The one or more transceivers may couple the communication device to a communication network and enable the communication device to transmit/receive messages/data over the communication network. Examples of the communication device may include, but are not limited to, a network element (e.g., a router, a switch, a gateway, and the like), a laptop, a personal digital assistant (PDA), a tablet computer, a smartphone, a cell phone, a phablet, and the like.

A "transportation network" refers to a network or an infrastructure that facilitates commutation between one or more locations in a geographical area using one or more means of transport. In an embodiment, the one or more means of transport may utilize one or more paths connecting one or more locations to commute. In an embodiment, the one or more means of transport may include public transport vehicles and private transport vehicles.

"One or more locations" refer to one or more distinct places or sites within a geographical area. In an embodiment, the one or more locations may be connected through one or more paths (e.g., one or more roads) and one or more vehicles may commute between the one or more locations through the one or more paths. In a scenario where the transportation network is a public transit system, in an embodiment, each location may correspond to at least one of a bus stop, a tramway station, a train station, or a metro station in the geographical area.

A "reachability tree" refers to a tree data structure that may be used to maintain connectivity information pertaining to a node (e.g., a communication device) in a connectivity graph. In an embodiment, the reachability tree may be created with a first communication device as its root node, such that the reachability tree includes a set of communication devices of the communication network, which are at a distance of less than a predefined path distance from the first communication device. In an embodiment, the reachability tree may correspond to a Breadth First Search (BFS) tree from the first communication device, having a number of levels equal to the predefined path distance.

A "path distance" refers to a number of edges in a path connecting two nodes (e.g., communication devices) in a connectivity graph. In a scenario where the one or more nodes correspond to one or more communication devices of a communication network, in an embodiment, the path distance between two communication devices may correspond to a number of hops between the two communication devices in the communication network. Further, in a scenario where the one or more nodes correspond to one or more locations of a transportation network, in an embodiment, the path distance between two locations may correspond to a geographical distance between the two locations of the transportation network. Hereinafter, the term "path distance" is interchangeably referred to as "distance", "length", or "path length".

A "predefined path distance" refers to a maximum permissible path distance between a root node of a reachability tree and any other node in the reachability tree. For instance, when the reachability tree is created with a first communication device as its root node, each communication device from a set of communication devices in the reachability tree may be at a path distance of at most the predefined path distance from the first communication device.

A "level in the reachability tree" refers a hierarchal position of a node (e.g., a communication device) in the reachability tree. In an embodiment, the reachability tree corresponds to a BFS tree from a first communication device, having a number of levels equal to the predefined path distance. Thus, in an embodiment, the level of a communication device in the reachability tree may correspond to a path distance of the communication device from the first communication device.

An "unreachability" refers to a scenario where two nodes (e.g., a pair of communication devices) of a connectivity graph become unconnected with each other through other nodes in the connectivity graph. In an embodiment, two communication devices may be reachable when there exists at least one path of less than the predefined path distance between the two communication devices. Thus, in embodiment, a pair of communication devices may become unreachable through another communication device (e.g., a hub device), when a path of less than the predefined path distance ceases to exist between either of the communication devices (in the pair of communication devices) and the other communication device (e.g., the hub device).

A "path-union graph" refers to a graphical data structure that represents information pertaining to one or more paths connecting two nodes (e.g., a pair of communication devices) in the connectivity graph. In an embodiment, each communication device, belonging to a path-union graph between a first communication device and a second communication device, may lie in a path connecting the first and the second communication devices, such that a total length of the path is less than the predefined path distance.

FIG. 1 is a block diagram of a system environment 100, in which various embodiments can be implemented. The system environment 100 includes an application server 102, one or more communication devices (e.g., 104a-104i), and a communication network 106. In an embodiment, the application server 102 and the one or more communication devices (e.g., 104a-104i) may be coupled to the communication network 106.

The application server 102 refers to a computing device including one or more processors and one or more memories. The one or more memories may include computer readable code that is executable by the one or more processors to perform predetermined operation. In an embodiment, the predetermined operation may include maintaining a reachability information among the one or more communication devices (e.g., 104a-104i) of the communication network 106. In an embodiment, at a first time instance, the application server 102 may create a first path-union graph between a first communication device (e.g., 104a) and a second communication device (e.g., 104c). The first time instance may correspond to a time instance when the first communication device (e.g., 104a) becomes unreachable from the second communication device (e.g., 104c) in the communication network 106. Thereafter, the application server 102 may create a reachability tree from the first path-union graph. In an embodiment, the reachability tree may be deterministic of a path distance between the first communication device (e.g., 104a) and a set of communication devices in the communication network 106 such that a path distance of each communication device in the set of communication devices is less than a predefined path distance. Further, the reachability tree may be deterministic of a reachability information between the first communication device (e.g., 104a) and the set of communication devices. In an embodiment, the reachability tree may correspond to a Breadth First Search (BFS) tree on the first path-union graph with the first communication device (e.g., 104a) as its root node. Further, in an embodiment, a number of levels within the BFS tree corresponding to the reachability tree may be equal to the predefined path distance. An embodiment of a method for creation of the reachability tree for the communication network 106 has been further explained in conjunction with FIG. 3.

Thereafter, at a third time instance after the first time instance, the application server 102 may receive an information pertaining to a failure of a communication link between a pair of communication devices (e.g., 104i and 104g) in the communication network 106. In an embodiment, from the reachability tree, the application server 102 may determine whether a fourth communication device (e.g., 104i) from the pair of communication device is at a distance greater than the predefined path distance from the first communication device (e.g., 104a). As each communication device in the reachability tree is at a distance of less than the predefined path distance from the first communication device (e.g., 104a), the fourth communication device may be at a distance of less than the predefined path distance from the first communication device (e.g., 104a) if the fourth communication device (e.g., 104i) is present within the reachability tree. Thereafter, if it is determined that the distance of the fourth communication device (e.g., 104i) from the first communication device (e.g., 104a) is less than the predefined path distance, the application server 102 may determine whether the fourth communication device (e.g., 104i) belongs to a first set of communication devices in the communication network 106. In an embodiment, each communication device in the first set of communication devices may be at a distance greater than a second predefined path distance from the first communication device (e.g., 104a). The second predefined path distance may correspond to a difference between the predefined path distance and a minimum predefined path distance associated with each communication device, where the minimum predefined path distance associated with a communication device corresponds to a minimum path distance of the communication device from at least the second communication device (e.g., 104c).

Further, if it is determined that the fourth communication device (e.g., 104i) does not belong to the first set of communication devices, the application server 102 may identify a fifth communication device (e.g., 104h) at a level preceding the fourth communication device (e.g., 104i) within the reachability tree. Once the fifth communication device (e.g., 104h) is identified, the application server 102 may determine whether the fifth communication device (e.g., 104h) belongs to the first set of communication devices in the communication network 106. If the fifth communication device (e.g., 104h) does not belong to the first set of communication devices, the application server 102 may add an edge between the first communication device (e.g., 104h) and the fourth communication device (e.g., 104i) to the reachability tree. However, if no communication device is present at a level preceding the fourth communication device (e.g., 104i) in the reachability tree or the fifth communication device (e.g., 104h) belongs to the first set of communication devices, the application server 102 may add the fourth communication device (e.g., 104i) to the first set of communication devices. The application server 102 may add the fourth communication device (e.g., 104i) to the first set of communication devices based on a level of the fourth communication device (e.g., 104i) in the reachability tree, the predefined path distance, and the minimum predefined path distance associated with the fourth communication device (e.g., 104i). Further, if the fourth communication device (e.g., 104i) is added to the first set of communication devices, the application server 102 may remove an edge between the fourth communication (e.g., 104i) and every other communication device that was previously connected to the fourth communication device (e.g., 104i) in the reachability tree. An embodiment of a method for updating the reachability tree based on a failure of communication link between a pair of communication devices in the communication network 106 has been explained further in conjunction with FIG. 4.

Thereafter, at a second time instance after the third time instance, when a third communication device (e.g., 104f) becomes unreachable from the first communication device (e.g., 104a), the application server 102 may create a second path-union graph between the first communication device (e.g., 104a) and the third communication device (e.g., 104f). The second path-union graph may be created in a manner similar to that of the first path-union graph. Further, the application server 102 may update the reachability tree based on the second path-union graph. To update the reachability graph, at the second time instance, the application server 102 may determine a path distance between the third communication device (e.g., 104f) and a sixth communication device (e.g., 104e) in the second path-union graph. Thereafter, the application server 102 may update the minimum predefined path distance associated with the sixth communication device (e.g., 104e) based on the path distance between the third communication device (e.g., 104f) and the sixth communication device (e.g., 104e). Further application server 102 determines whether the sixth communication device (e.g., 104e) belongs to the first set of communication devices. If the sixth communication device (e.g., 104e) belongs to the first set of communication devices, the application server 102 may remove the sixth communication device (e.g., 104e) from the first set of communication devices based on the updation of the minimum predefined path distance associated with the sixth communication device (e.g., 104e). Further, the application server 102 may add one or more edges in the second path-union graph to the reachability tree. An embodiment of a method of updation of the reachability tree based on the second path-union graph has been explained further in conjunction with FIG. 5.

The application server 102 may be realized through various types of application servers such as, but not limited to, a Java application server, a .NET framework application server, a Base4 application server, a PHP framework application server, or any other application server framework.

Each of the one or more communication devices (e.g., 104a-104i) refers to a computing device including one or more processors, one or more memories, and one or more transceivers. The one or more memories may include computer readable code that is executable by the one or more processors to perform predetermined operations. Further, the one or more transceivers may couple each of the one or more communication devices (e.g., 104a-104i) to the communication network 106. Each of the one or more communication devices (e.g., 104a-104i) may transmit/receive messages/data over communication network 106 through the one or more transceivers. In an embodiment, the one or more communication devices (e.g., 104a-104i) may be connected with one another over the communication network 106. In an embodiment, each of the one or more communication devices (e.g., 104a-104i) may transmit an information pertaining to a connectivity of the communication device with other communication devices in the communication network 106. In an embodiment, the application server 102 may maintain an information pertaining to a connectivity of the one or more communication devices (e.g., 104a-104i) in the communication network 106. The connectivity information may be maintained in a graph data structure (e.g., a connectivity graph). However, a person skilled in the art will understand that the scope of the disclosure should not be limited to the application server 102 maintaining the connectivity information associated with the one or more communication devices (e.g., 104a-104i). In an embodiment, the one or more communication devices (e.g., 104a-104i) may be themselves maintain the connectivity information without departing from the spirit of the disclosure.

The one or more communication devices (e.g., 104a-104i) may include a variety of computing devices such as, but not limited to, a network element (e.g., a router, a switch, a gateway, and the like), a laptop, a personal digital assistant (PDA), a tablet computer, a smartphone, a cell phone, a phablet, and the like.

A person having ordinary skill in the art will understand that the scope of the disclosure is not limited to the communication network 106 including nine communication devices (i.e., 104a-104i), as depicted in FIG. 1. The communication network 106 may have any number of communication devices without departing from the spirit of the disclosure.

Further, a person skilled in the art will understand that the scope of the disclosure should not be limited to the application server 102 being realized as a separate entity. In an embodiment, one of the one or more communication devices (e.g., 104a-104i) may host the application server 102 as an application software running on it. In such a scenario, the communication device hosting the application server 102 may assume the role of the application server 102 and may perform the functionalities of the application server 102 without departing from the spirit of the disclosure.

The communication network 106 corresponds to a medium through which content and messages flow between various devices of the system environment 100 (e.g., the application server 102 and the one or more communication devices (e.g., 104a-104i)). Examples of the communication network 106 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the communication network 106 in accordance with various wired and wireless communication protocols such as Transmission Control Protocol and Internet Protocol (TCP/IP), User Datagram Protocol (UDP), and 2G, 3G, or 4G communication protocols.

Figure 2:
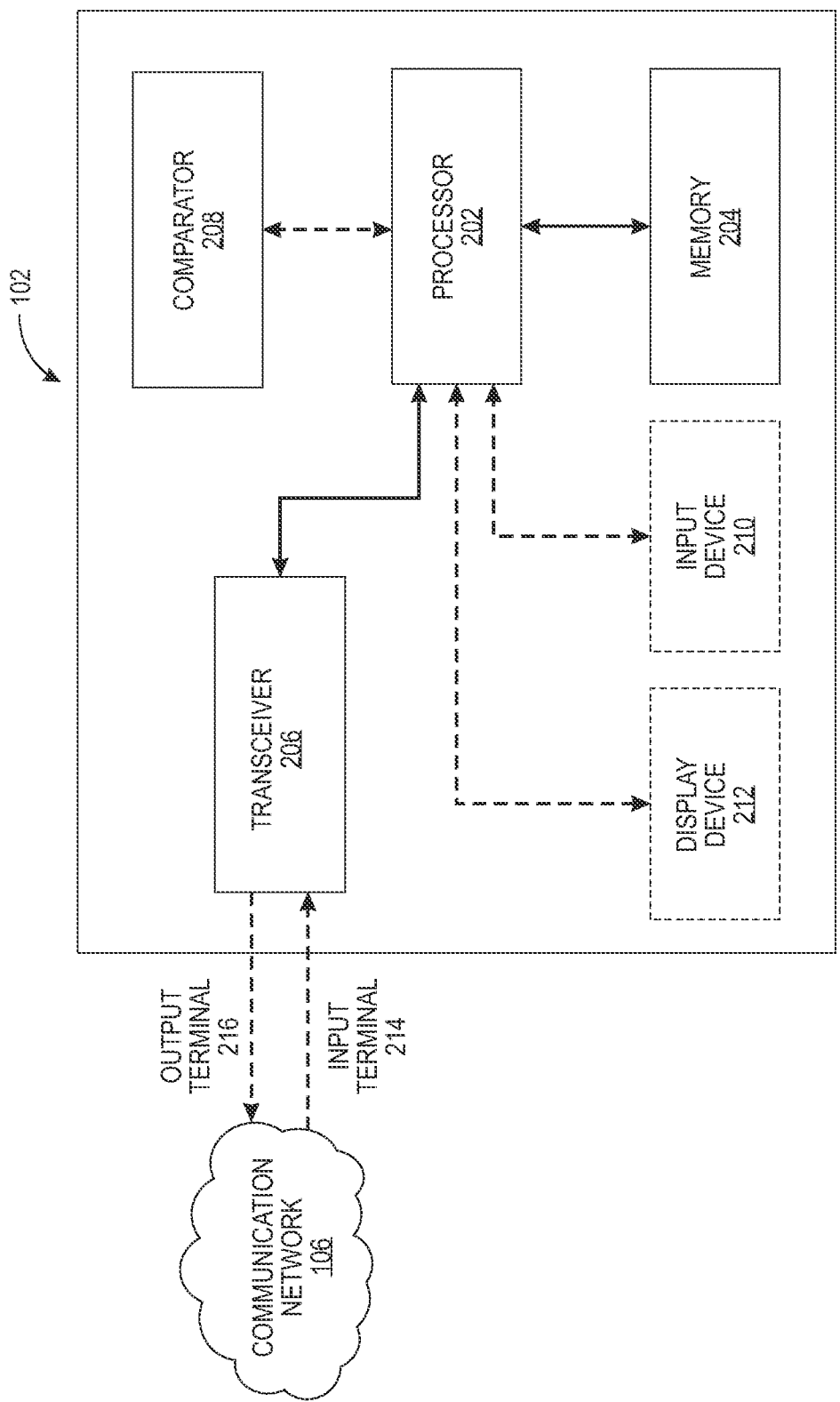
FIG. 2 is a block diagram that illustrates an application server, in accordance with at least one embodiment.

FIG. 2 is a block diagram that illustrates the application server 102, in accordance with at least one embodiment. The application server 102 includes a processor 202, a memory 204, a transceiver 206, a comparator 208, an input device 210, a display device 212, an input terminal 214, and an output terminal 216. The processor 202 is coupled to the memory 204, the transceiver 206, the comparator 208, the input device 210, and the display device 212. The transceiver 206 is connected to the communication network 106 through the input terminal 214 and the output terminal 216.

The processor 202 includes suitable logic, circuitry, and/or interfaces that are operable to execute one or more instructions stored in the memory 204 to perform predetermined operations. The processor 202 may be implemented using one or more processor technologies known in the art. Examples of the processor 202 include, but are not limited to, an x86 processor, an ARM processor, a Reduced Instruction Set Computing (RISC) processor, an Application-Specific Integrated Circuit (ASIC) processor, a Complex Instruction Set Computing (CISC) processor, or any other processor.

The memory 204 stores a set of instructions and data. Some of the commonly known memory implementations include, but are not limited to, a random access memory (RAM), a read only memory (ROM), a hard disk drive (HDD), and a secure digital (SD) card. Further, the memory 204 includes the one or more instructions that are executable by the processor 202 to perform specific operations. It is apparent to a person with ordinary skills in the art that the one or more instructions stored in the memory 204 enable the hardware of the application server 102 to perform the predetermined operations.

The transceiver 206 receives and transmits messages and data from/to various components of the system environment 100 (e.g., the one or more communication devices (e.g., 104a-104i)) over the communication network 106 through the input terminal 214 and the output terminal 216. Examples of the transceiver 206 may include, but are not limited to, an antenna, an Ethernet port, a USB port, or any other port that can be configured to receive and transmit data. The transceiver 206 receives and transmits data/messages in accordance with the various communication protocols, such as, TCP/IP, UDP, and 2G, 3G, or 4G communication protocols.

The comparator 208 is configured to compare at least two input signals to generate an output signal. In an embodiment, the output signal may correspond to either "1" or "0." In an embodiment, the comparator 208 may generate output "1" if the value of a first signal (from the at least two signals) is greater than the value of a second signal (from the at least two signals). Similarly, the comparator 208 may generate an output "0" if the value of the first signal is less than the value of the second signal. In an embodiment, the comparator 208 may be realized through either software technologies or hardware technologies known in the art. Though, the comparator 208 is depicted as independent from the processor 202 in FIG. 2, a person skilled in the art will appreciate that the comparator 208 may be implemented within the processor 202 without departing from the scope of the disclosure.

The input device 210 may comprise suitable logic, circuitry, interfaces, and/or code that may be operable to receive an input from a user. The input device 210 may be operable to communicate with the processor 202. Examples of the input devices may include, but are not limited to, a touch screen, a keyboard, a mouse, a joystick, a microphone, a camera, a motion sensor, a light sensor, and/or a docking station.

The display device 212 may comprise suitable logic, circuitry, interfaces, and/or code that may be operable to render a display. In an embodiment, the display device 212 may be realized through several known technologies such as, Cathode Ray Tube (CRT) based display, Liquid Crystal Display (LCD), Light Emitting Diode (LED) based display, Organic LED display technology, and Retina display technology. In addition, in an embodiment, the display device 212 may be capable of receiving input from a user. In such a scenario, the display device 212 may be a touch screen that enables the user to provide input. In an embodiment, the touch screen may correspond to at least one of a resistive touch screen, capacitive touch screen, or a thermal touch screen. In an embodiment, the display device 212 may receive input through a virtual keypad, a stylus, a gesture, and/or touch based input.

Figure 3:
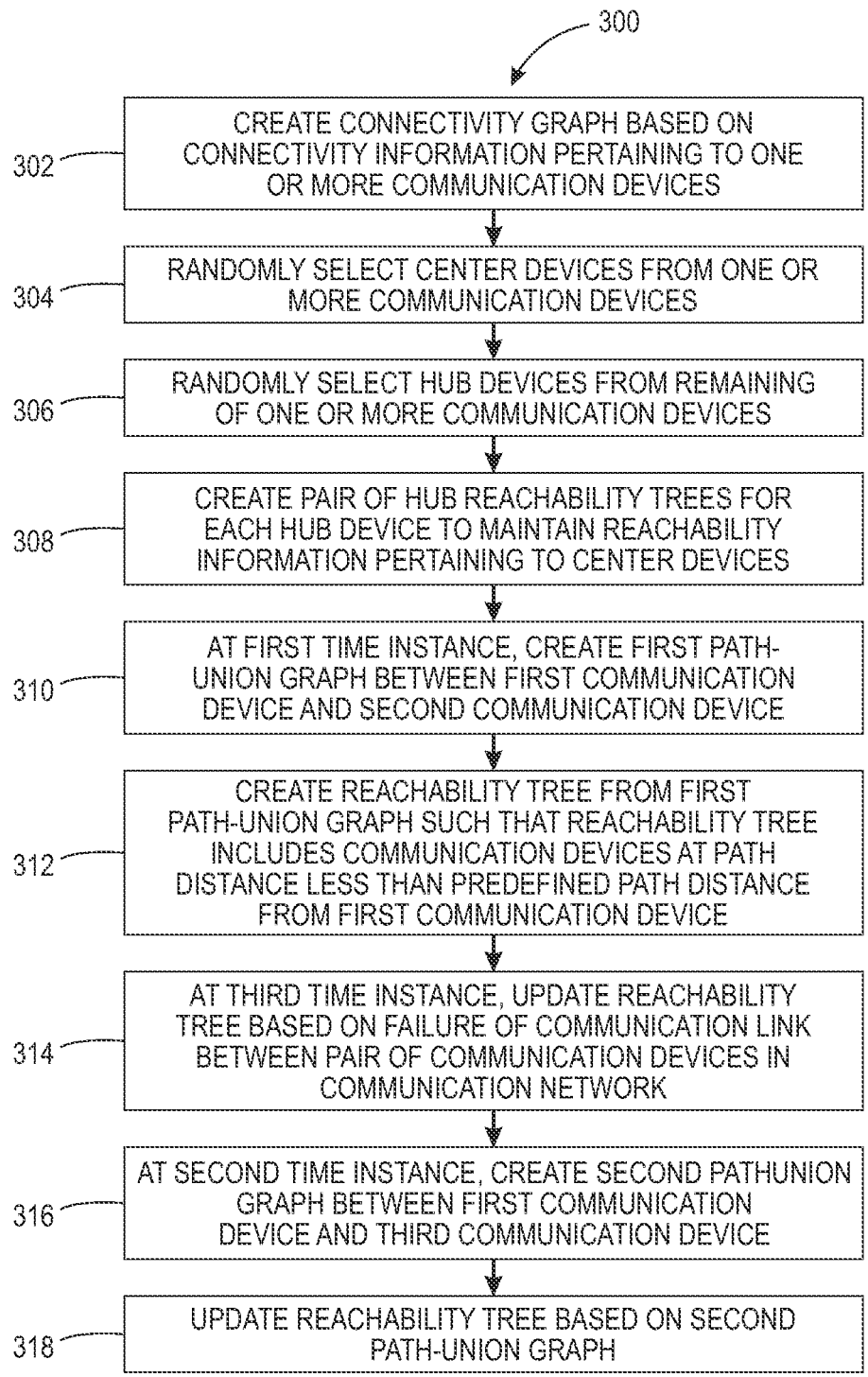
FIG. 3 depicts a flowchart illustrating a method for maintaining a reachability information among the one or more communication devices, in the communication network, in accordance with at least one embodiment.

An embodiment of the operation of the application server 102 for maintaining reachability information among one or more communication devices (e.g., 104a-104i) of the communication network 106 has been explained further in conjunction with FIG. 3.

FIG. 3 depicts a flowchart 300 illustrating a method for maintaining a reachability information among the one or more communication devices (e.g., 104a-104i) in the communication network 106, in accordance with at least one embodiment. The flowchart 300 has been described in conjunction with FIG. 1 and FIG. 2.

At step 302, a connectivity graph (G) associated with the one or more communication devices (e.g., 102a-102i) in the communication network 106 is created. In an embodiment, the processor 202 is configured to create the connectivity graph G based on a connectivity information pertaining to the one or more communication devices (e.g., 102a-102i) of the communication network 106. In an embodiment, the processor 202 may receive the connectivity information pertaining to each communication device from the respective communication device of the communication network 106, through the transceiver 206. In an embodiment, to receive the connectivity information from each communication device, the processor 202 may use one or more communication protocols such as, but not limited to, Simple Network Management Protocol (SNMP), Remote Monitoring (RMON) Protocol, Routing Information Protocol (RIP), and Border Gateway Protocol (BGR). In an embodiment, the connectivity information pertaining to a communication device may be indicative a connectivity state of the communication device with the other communication devices in the communication network 106. In an embodiment, the connectivity graph G may be a directed graph including one or more nodes, each of which may represent the one or more communication devices (e.g., 102a-102i) of the communication network 106. Two nodes may be connected by an edge in the connectivity graph G if the respective communication devices have connectivity in the communication network 106. Further, the direction of the edge may be indicative of a direction of communication between the two communication devices (e.g., in case of unidirectional communication). In another embodiment, the direction of the edge may be indicative of a master-slave relationship between the two communication devices. For instance, the communication device from which the edge originates may correspond to the master device, while the other communication device, at which the edge terminates, may correspond to the slave device, with respect to the communication between the two devices.

At step 304, center devices are selected from the one or more communication devices (e.g., 102a-102i). In an embodiment, the processor 202 is configured to randomly select Ö(c) center devices (i.e., poly-log c center devices) from the one or more communication devices (e.g., 104a-104i). Thereafter, the processor 202 may create a center graph C(G), which includes the Ö(c) center devices. In an embodiment, the center graph C(G) may include an edge between a pair of center devices c1 and c2, when there exists a path of less than a predefined path distance between the center devices c1 and c2 in the connectivity graph G. In an embodiment, the predefined path distance may correspond to a ratio of a count of the one or more communication devices (e.g., 104a-104i) (represented by n) and a count of the center devices (represented by c). Thus, the predefined path distance may be expressed as n/c. In an embodiment, to maintain the connectivity information between the one or more communication devices (e.g., 104a-104i), the processor 202 may maintain the connectivity information between the Ö(c) center devices using the center graph C(G).

At step 306, hub devices are selected from remaining of the one or more communication devices (e.g., 102a-102i). In an embodiment, the processor 202 is configured to randomly select Ö(b) hub devices (i.e., poly-log b hub devices) from remaining of the one or more communication devices (e.g., 102a-102i) in the communication network 106. In an embodiment, the processor 202 may select the hub devices in two stages. In the first stage, the processor 202 may randomly identify a first group of communication devices from the one or more communication devices (102a-102i) in the connectivity graph G with a probability of b/n, where b is the total number of hub devices to be selected and n is the count of the one or more communication devices (e.g., 104a-104i). In the second stage, the processor 202 may randomly identify a group of connectivity links (represented by edges) from the connectivity graph G with a probability of b/m, where b is the total number of hub devices to be selected and m is a count of connectivity links (i.e., edges) in the connectivity graph G. Thereafter, the processor 202 may identify a second group of communication devices in the connectivity graph G, which are associated with the group of connectivity links. For instance, for each connectivity link in the group of connectivity links, the processor 202 may identify a pair of communication devices that are connected with each other through that connectivity link. Such pairs of communication devices may be associated with the group of connectivity links, and thereby be a part of the second group of communication devices. Thereafter, the processor 202 may select the identified first group of communication devices and the second group of communication devices as the Ö(b) hub devices.

At step 308, a pair of hub reachability trees are created for each hub device h. In an embodiment, the processor 202 is configured to create the pair of hub reachability trees for each hub device h. To that end, for each hub device h, the processor 202 may create a first hub reachability tree (in the pair of reachability trees) from the connectivity graph G. Further, for the hub device h, the processor 202 may create a second hub reachability tree (in the pair of reachability trees) from a transpose/inverse of the connectivity graph G'. As discussed in supra, the connectivity graph G may correspond to a directed graph, therefore, the transpose/inverse of the connectivity graph G' may be obtained by reversing the directions of edges in the connectivity graph G. In an embodiment, each hub reachability tree of the hub device h may correspond to a BFS tree including a set of communication devices at a path distance of less than the predefined path distance from the hub device h. In an embodiment, the processor 202 may maintain reachability information between center devices through each hub device using the pair of hub reachability trees of the respective hub devices.

In an embodiment, a center device c1 may be reachable from a hub device h when there exists a path of less than the predefined path distance connecting the center device c1 and the hub device h in the connectivity graph G. In such a scenario, the center device c1 may be a part of the first hub reachability tree of the hub device h. Similarly, the hub device h may be reachable from a center device c2 when there exists a path of less than the predefined path distance connecting the hub device h to the center device c2 in the transpose/inverse of the connectivity graph G'. In such a scenario, the center device c2 may be a part of the second hub reachability tree of the hub device h. A person skilled in the art will understand that the center devices c1 and c2 may be reachable through the hub device h when the center device c1 is a part of the first hub reachability tree of the hub device h and the center device c2 is a part of the second hub reachability tree of the hub device h, or vice versa. Thus, the processor 202 may maintain information pertaining to reachability of various center devices through the hub devices using the pair of hub reachability trees of the respective hub devices. In an embodiment, the processor 202 may maintain the reachability information in the pair of hub reachability trees of each hub device based on communication with the respective hub devices using one or more communication protocols such as, but not limited to, SNMP, RMON Protocol, RIP, and BGR. Each hub device may in-turn use the aforementioned one or more communication protocols to determine the reachability of the various center devices from the respective hub device.

At step 310, a first path-union graph is created between a first communication device (e.g., 104a) and a second communication device (e.g., 104c) in the communication network 106. In an embodiment, the processor 202 is configured to perform the step 310 at a first time instance when the second communication device (e.g., 104c) becomes unreachable from the first communication device (e.g., 104a). A person skilled in the art will appreciate that the first communication device (e.g., 104a) and the second communication device (e.g., 104c) may correspond to center devices. Further, the unreachability of the first communication device (e.g., 104a) from the second communication device (e.g., 104c) may correspond to an unreachability of either of the communication devices from a hub device (e.g., 104b) through which they were connected before the first time instance. In an embodiment, the processor 202 may determine the unreachability of the first communication device (e.g., 104a) from the second communication device (e.g., 104c) through the hub device (e.g., 104b) based on communication with the hub device (e.g., 104b) using the one or more communication protocols (such as, but not limited to, SNMP, RMON Protocol, RIP, and BGR). Further, the processor 202 may update the reachability information in the pair of hub reachability trees of the hub device (e.g., 104b) based on the communication. For instance, from the hub device (e.g., 104b), the processor 202 may receive an indication of the first communication device (e.g., 104a) becoming unreachable from the second communication device (e.g., 104c) through the hub device (e.g., 104b). After receiving such an indication, the processor 202 may create the first path-union graph between the first communication device (e.g., 104a) and the second communication device (e.g., 104c), as described next.

In an embodiment, the processor 202 may create the first path-union graph in three stages. In the first stage, the processor 202 may create a first BFS tree from the first communication device (e.g., 104a) using the connectivity graph G. In the second stage, the processor 202 may create a second BFS tree from the second communication device (e.g., 104c) using the transpose/inverse of the connectivity graph G'. In the third stage, the processor 202 may select communication devices and their associated connectivity links from the first BFS tree and the second BFS tree such that a sum of a first path distance and a second path distance is less than the predefined path distance. The first path distance may correspond to a distance between the first communication device (e.g., 104a) and the selected communication device in the connectivity graph G, while the second path distance may correspond to a distance between the selected communication device and the second communication device (e.g., 104c) in the transpose/inverse of the connectivity graph G'. Thereafter, the processor 202 may add the selected communication devices and their associated connectivity links between the first communication device (e.g., 104a) and the second communication device (e.g., 104c) to create the first path-union graph. A person skilled in the art will understand that the first path-union graph may include a path between the first communication device (e.g., 104a) and the second communication device (e.g., 104c) such that a length of the path may be less than the predefined path distance. Further, the communication devices selected in the third stage of the aforementioned procedure may be within the path connecting the first communication device (e.g., 104a) and the second communication device (e.g., 104c) in the first path-union graph.

At step 312, a reachability tree is created from the first path-union graph. In an embodiment, the processor 202 is configured to create the reachability tree from the first path-union graph such that the reachability tree includes a set of communication devices in the first path-union graph, which are at a distance of less than the predefined path distance from the first communication device (e.g., 104a). In an embodiment, the reachability tree may correspond to a BFS tree created on the first path-union graph with the first communication device (e.g., 104a) as its root node. A person skilled in the art will understand that a number of levels in the reachability tree may correspond to the predefined path distance. Thus, each communication device in set of communication devices within the reachability tree may be at a level less than the predefined path distance.

At step 314, the reachability tree is updated on an event of failure of a communication link between a pair of communication devices in the communication network 106. In an embodiment, the processor 202 is configured to perform the step 314 at a third time instance, after the first time instance. The third time instance may correspond to a time instance when the communication link between the pair of communication devices in the communication network 106 fails. In an embodiment, from either of the communication devices in the pair of communication devices, the processor 202 may receive an information indicative of the failure of the communication link between the pair of communication devices. Alternatively, the processor 202 may receive this information from another communication device of the communication network 106. On receiving the information, the processor 202 may update the reachability tree as explained further in conjunction with FIG. 4.

At step 316, a second path-union graph is created between the first communication device (e.g., 104a) and a third communication device (e.g., 104f) in the communication network 106. In an embodiment, the processor 202 is configured to perform the step 316 at a second time instance, after the third time instance, when the third communication device (e.g., 104f) becomes unreachable from the first communication device (e.g., 104a). In an embodiment, the third communication device (e.g., 104f) may correspond to a center device. A person skilled in the art will understand that the unreachability of the third communication device (e.g., 104f) from the first communication device (e.g., 104a) may correspond to either of the third communication device (e.g., 104f) or the first communication device (e.g., 104a) becoming unreachable from the hub device (e.g., 104b) through which they were connected before the second time instance. In an embodiment, the processor 202 may determine the unreachability of the first communication device (e.g., 104a) from the third communication device (e.g., 104f) through the hub device (e.g., 104b) based on communication with the hub device (e.g., 104b) using the one or more communication protocols (such as, but not limited to, SNMP, RMON Protocol, RIP, and BGR). Further, the processor 202 may update the reachability information in the pair of hub reachability trees of the hub device (e.g., 104b) based on the communication. In an embodiment, from the hub device (e.g., 104b), the processor 202 may receive an indication of the first communication device (e.g., 104a) becoming unreachable from the third communication device (e.g., 104f) through the hub device (e.g., 104b). After receiving such an indication, the processor 202 may create the second path-union graph between the first communication device (e.g., 104a) and the third communication device (e.g., 104f). In an embodiment, the processor 202 may create the second path-union graph in manner similar to the first path-union graph, as explained in supra.

At step 318, the reachability graph is updated based on the second path-union graph. In an embodiment, the processor 202 is configured to update the reachability graph based on the second path-union graph. The updation of the reachability graph based on the second path-union graph has been explained further in conjunction with FIG. 5.

Figure 4:
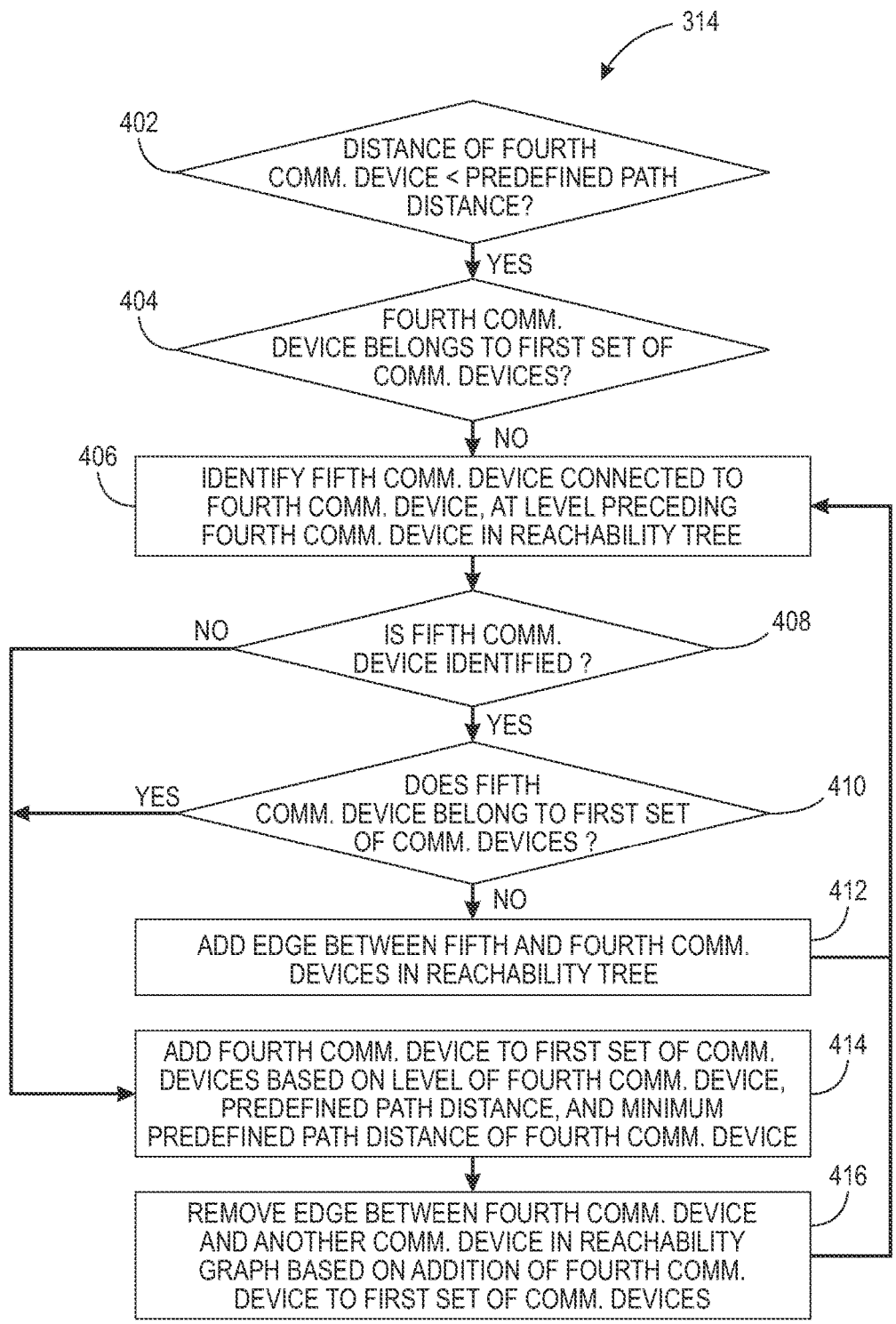
FIG. 4 depicts a flowchart illustrating a method for updating a reachability tree of a first communication device in a communication network based on failure of a communication link between a pair of communication devices in the communication network, in accordance with at least one embodiment.

FIG. 4 depicts a flowchart 314 illustrating a method for updating the reachability tree of the first communication device (e.g., 104a) based on failure of a communication link between a pair of communication devices in the communication network 106, in accordance with at least one embodiment. The flowchart 314 has been described in conjunction with FIG. 1, FIG. 2, and FIG. 3.

For the purpose of the ongoing discussion, a pair of communication devices 104i and 104g are considered as connected with each other prior to the third time instance. Further, the communication link between the communication devices 104i and 104g is considered to fail at the third time instance. Thus, an edge connecting the communication devices 104i and 104g in the connectivity graph G may be deleted at the third time instance. Further, for the purpose of the ongoing discussion, the communication device 104i is considered as a fourth communication device. A person skilled in the art will understand that the fourth communication device may correspond to a communication device, in the pair of communication devices, having an incoming edge (within the connectivity graph G) from the other communication device, in the pair of communication devices, prior to the third time instance.

At step 402, a check is performed to determine whether a distance of the fourth communication device (e.g., 104i) from the first communication device (e.g., 104a) is less than the predefined path distance. In an embodiment, the processor 202 is configured to perform the check using the comparator 208. A person skilled in the art will understand that the distance of the fourth communication device (e.g., 104i) from the first communication device (e.g., 104a) may be less than the predefined path distance when the fourth communication device (e.g., 104i) is within the reachability tree of the first communication device (e.g., 104a). If it is determined that the distance is less than the predefined path distance, the processor 202 may perform step 404. Otherwise, the processor 202 may not update the reachability tree, as, in such a scenario, the fourth communication device (e.g., 104i) may not be within the reachability tree.

At step 404, a check is performed to determine whether the fourth communication device (e.g., 104i) belongs to a first set of communication devices. In an embodiment, the processor 202 is configured to perform the check. In an embodiment, each communication device in the first set of communication devices may be at a distance greater than a second predefined path distance from the first communication device (e.g., 104i), where the second predefined path distance may correspond to a difference between the predefined path distance and a minimum predefined path distance associated with the respective communication device. The minimum predefined path distance associated with a communication device may correspond to a minimum path distance of the communication device from at least the second communication device (e.g., 104e). The following equations denote the second predefined path distance and the minimum predefined path distance:

$$D_2(v,t)=D_1-(v,t) \tag{1}$$

where, $D_2(v, t)$: the second predefined path distance associated with a communication device v at a time instance t (i.e., a distance of the communication device v from the first communication device at the time instance t);

$D_1$: the predefined path distance (where $D_1=n/c$, n: the number of communication devices in the communication network 106 and c: number of center devices);

$M(v, t)$: the minimum predefined path distance associated with the communication device v at the time instance t, where $$M(v,t)=\min_{t_j=t} d'(c_j,v,t_j) \tag{2}$$

where, $d'(c_j, v, t_j)$: a distance between a center device $c_j$ and the communication device v in the transpose/inverse of the connectivity graph G' at a time instance $t_j$ (where the center device $c_j$ becomes unreachable from the first communication device (e.g., 104a) at the time instance $t_j$).

In an embodiment, within the memory 204, the processor 202 may maintain a list including identifications of devices that belong to the first set of communication devices. For instance, an identification of a communication device may correspond to an IP address, a MAC address, or a user-provided name/alias of the communication device. The processor 202 may use the comparator 208 to check whether the identification of the fourth communication device (e.g., 104i) is included within the list of identifications of the devices belonging to the first set of communication devices.

If it is determined that the fourth communication device (e.g., 104*i*) does not belong to the first set of communication devices, the processor 202 may perform step 406. Otherwise, the processor 202 may not update the reachability tree, as, in such a scenario, no path, passing through the fourth communication device (e.g., 104*i*) and having a length less than the predefined path distance, may exist between the first communication device (e.g., 104*a*) and the second communication device (e.g., 104*c*). Hence, even if the fourth communication device (e.g., 104*i*) is a part of the reachability tree, the fourth communication device (e.g., 104*i*) may not contribute to the reachability of the first communication device (e.g., 104*a*) from the second communication device (e.g., 104*c*). Thus, in such a scenario, the processor 202 may consider the fourth communication device (e.g., 104*i*) as a spurious device with respect to the updation of the reachability tree.

At step 406, a fifth communication device (e.g., 104*h*) is identified. In an embodiment, the processor 202 is configured to identify the fifth communication device (e.g., 104*h*) such that the fifth communication device (e.g., 104*h*) is connected to the fourth communication device (e.g., 104*i*) in the communication network 106 and the fifth communication device (e.g., 104*h*) is at a level preceding the fourth communication device (e.g., 104*i*) in the reachability tree. Thus, to identify the fifth communication device (e.g., 104*h*), the processor 202 may first identify those communication devices in the communication network 106 that have a communication link with the fourth communication device (e.g., 104*i*). Thereafter, the processor 202 may select the fifth communication device (e.g., 104*h*), from the identified communication devices, as a communication device that is present in the reachability tree at a level immediately preceding the level of the fourth communication device (e.g., 104*i*). A person skilled in the art will understand that in certain scenarios the processor 202 may not be able to identify any communication device as the fifth communication device (e.g., 104*h*). For instance, the processor 202 may not be able to identify the fifth communication device when the fourth communication device (e.g., 104*i*) does not have a communication link with any other communication device in the reachability tree. Further, the processor 202 may not be able to identify the fifth communication device if none of the communication devices with which the fourth communication device (e.g., 104*i*) has a communication link in the communication network 106 is at a level preceding the fourth communication device (e.g., 104*i*) in the reachability tree.

At step 408, a check is performed to determine whether the fifth communication device was identified at the step 406. In an embodiment, the processor 202 is configured to perform the check. If the processor 202 determines that the fifth communication device (e.g., 104*h*) was identified, the processor 202 may perform step 410. Otherwise, the processor 202 may perform step 414.

At step 410, a check is performed to determine whether the fifth communication device (e.g., 104*h*) belongs to the first set of communication devices. In an embodiment, the processor 202 is configured to perform the check using the comparator 208, in a manner similar to that described in conjunction with 404. If the processor 202 determines that the fifth communication device (e.g., 104*h*) does not belong to the first set of communication devices, the processor 202 may perform step 412. Otherwise, the processor 202 may perform the step 414.

At step 412, an edge is added between the fifth communication device (e.g., 104*h*) and the fourth communication device (e.g., 104*i*) in the reachability tree. In an embodiment, the processor 202 is configured to add the edge between the fifth communication device (e.g., 104*h*) and the fifth communication device (e.g., 104*i*) in the reachability tree. A person skilled in the art will understand that the processor 202 may add the edge between the fifth and the fourth communication devices (e.g., 104*h* and 104*i* respectively) to the reachability tree to replace an earlier edge between the pair of communication devices 104*g* and 104*i* (which existed prior to the third time instance) in the reachability tree. Further, the processor 202 may add the edge between the fifth and the fourth communication devices (e.g., 104*h* and 104*i*, respectively) in a scenario where the fifth and the fourth communication devices (e.g., 104*h* and 104*i*, respectively) are connected in the communication network 106 and the fifth communication device (e.g., 104*h*) is at a level preceding the fourth communication device (e.g., 104*i*) in the reachability tree. Further, in such a scenario, neither of the fifth or the fourth communication devices (e.g., 104*h* and 104*i*, respectively) may belong to the first set of communication devices.

At this stage, the updation of the reachability tree with respect to the loss of connectivity between the pair of communication devices (e.g., 104*g* and 104*i*) in the communication network 106 may be complete. However, the processor 202 may iterate the procedure of the flowchart 314 from the step 406 for any other communication device with respect to which the reachability tree is yet to be updated. In an embodiment, within the memory 204, the processor 202 may maintain a list of unprocessed communication devices, which may include identifications of communication devices with respect to which the reachability tree is yet to be updated. In an embodiment, an unprocessed communication device may correspond to a communication device that losses connectivity with another communication device in the communication network 106. Further, the unprocessed communication device may also correspond to a communication device that is associated with/connected with another unprocessed communication device.

Thus, at this stage, the processor 202 may iterate the procedure of the flowchart 314 from the step 406 for each communication device present in the list of unprocessed communication devices. A person skilled in the art will understand that before iterating the procedure of the flowchart 314, the processor 202 may select a communication device that has a least distance from the first communication device (e.g., 104*a*), among the other communication devices in the list of unprocessed communication devices. Thereafter, the processor 202 may iterate the procedure of the flowchart 314 from the step 406 for the selected communication device, and so on.

At step 414, the fourth communication device (e.g., 104*i*) is added to the first set of communication devices. In an embodiment, the processor 202 is configured to add the fourth communication device (e.g., 104*i*) to the first set of communication devices. A person skilled in the art will understand that the processor 202 may add the fourth communication device (e.g., 104*i*) to the first set of communication device in a scenario where either no communication device is identified as the fifth communication device (refer the steps 406 and 408) or if the fifth communication device (e.g., 104*h*) is identified but the fifth communication device (e.g., 104*h*) is not at the level immediately preceding the level of the fourth communication device (e.g., 104*i*) in the reachability tree. In an embodiment, the addition of the fourth communication device (e.g., 104*i*) to the first set of communication devices may be based on the level of the fourth communication device (e.g., 104*i*) in the reachability tree, the predefined path distance, and the minimum predefined path distance associated with the fourth communication device (e.g., 104*i*). For instance, the processor 202 may evaluate the second predefined path distance associated with the fourth communication device (e.g., 104*i*) using equations 1 and 2 mentioned in supra. Thereafter, the processor 202 may use the comparator 208 to compare the second predefined path distance associated with the fourth communication device (e.g., 104*i*) with the level of the fourth communication device (e.g., 104*i*) in the reachability tree. Based on the comparison, if it is determined that the second predefined path distance associated with the fourth communication device (e.g., 104*i*) is equal to the level of the fourth communication device (e.g., 104*i*), the processor 202 may add the fourth communication device (e.g., 104*i*) to the first set of communication devices.

At step 416, edges between the fourth communication device (e.g., 104*i*) and every other communication device, connected to the fourth communication device (e.g., 104*i*), are deleted from the reachability tree. In an embodiment, the processor 202 is configured to delete the edges between the fourth communication device (e.g., 104*i*) and every other communication device, connected to the fourth communication device (e.g., 104*i*), from the reachability tree, based on the addition of the fourth communication device (e.g., 104*i*) to the first set of communication devices. A person skilled in the art will understand that the processor 202 may delete the edges in the scenario where the fourth communication device (e.g., 104*i*) is added to the first set of communication device at the step 414. Further, the processor 202 may add the other communication devices, which were connected to the fourth communication device (e.g., 104*i*) through the deleted edges, to the list of unprocessed communication devices. Thereafter, the processor 202 may repeat the procedure of the flowchart 314 from the step 406 for each communication device in the list of unprocessed communication devices, starting with the communication device having a least distance from the first communication device (e.g., 104*a*), among the unprocessed communication devices, as discussed in supra.

A person skilled in the art will understand that in a scenario where the fourth communication device (e.g., 104*i*) is not added to the first set of communication devices at the step 414, the processor 202 may not perform the step 416. Instead, the processor 202 may increment the level of the fourth communication device (e.g., 104*i*) in the reachability tree by one. Thereafter, the processor 202 may add the fourth communication device (e.g., 104*i*) to the list of unprocessed communication devices. Further, the processor 202 may identify communication devices in the reachability tree that are connected to the fourth communication device (e.g., 104*i*). In an embodiment, the processor 202 may also add such identified communication devices to the list of unprocessed communication devices. Thereafter, the processor 202 may repeat the procedure of the flowchart 314 from the step 406 for each communication device in the list of unprocessed communication devices, starting with the communication device having a least distance from the first communication device (e.g., 104*a*), among the unprocessed communication devices, as discussed in supra.

Figure 5:
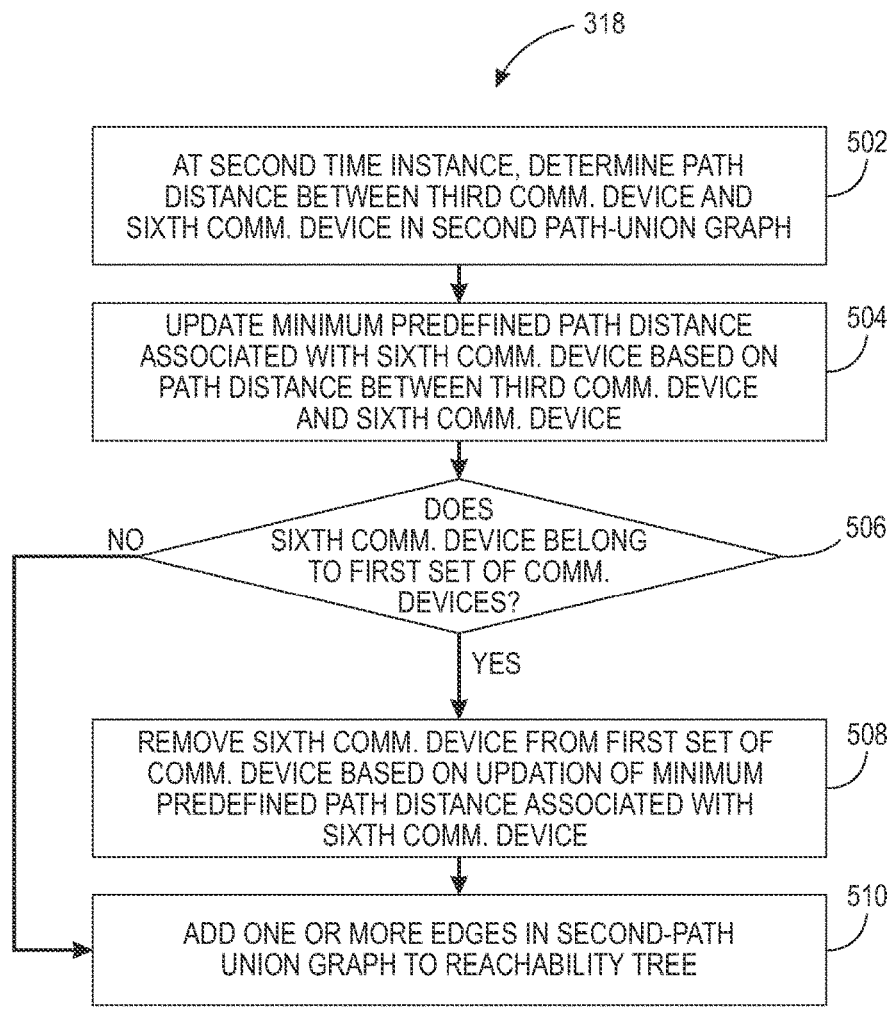
FIG. 5 depicts a flowchart illustrating a method for updating a reachability tree of a first communication device in a communication network based on a creation of a path-union graph of the first communication device, in accordance with at least one embodiment.

FIG. 5 depicts a flowchart 318 illustrating a method for updating the reachability tree of the first communication device (e.g., 104*a*) based on the creation of the second path-union graph, in accordance with at least one embodiment. The flowchart 318 has been described in conjunction with FIG. 1, FIG. 2, and FIG. 3.

At step 502, a path distance between the third communication device (e.g., 104*f*) and a sixth communication device (e.g., 104*e*) in the second path-union graph is determined. In an embodiment, the processor 202 is configured to determine the path distance between the third communication device (e.g., 104*f*) and the sixth communication device (e.g., 104*e*). In an embodiment, the sixth communication device (e.g., 104*e*) may correspond to a communication device in the second path-union graph, having an incoming edge (considering the second path-union graph G as a directed graph) from another communication device in the second path-union graph. Further, the other communication device, connected to the sixth communication device (e.g., 104*e*) in the second path-union graph, may have a least path distance from the first communication device (e.g., 104*a*), with respect to the remaining communication devices in the second path-union graph. In an embodiment, the processor 202 may perform the step 502 at the second time instance, which corresponds to a time instance after the third time instance and the first time instance, as discussed in supra.

A person skilled in the art will understand that the scope of the disclosure is not limited to considering the sixth communication device as a communication device in the pair of communication devices, which has an incoming edge in the connectivity graph. In a scenario where the connectivity graph is an undirected connectivity graph, either of the communication devices in the pair of communication devices may be considered as the sixth communication device without departing from the spirit of the disclosure.

At step 504, the minimum predefined path distance associated with the sixth communication device (e.g., 104*e*) is updated. In an embodiment, the processor 202 is configured to update the minimum predefined path distance associated with the sixth communication device (e.g., 104*e*) based on the path distance between the third communication device (e.g., 104*f*) and the sixth communication device (e.g., 104*e*). To update the minimum predefined path distance, in an embodiment, the processor 202 may use the comparator 208 to compare the path distance between the third communication device (e.g., 104*f*) and the sixth communication device (e.g., 104*e*) with the previous value of the minimum predefined path distance associated with the sixth communication device (e.g., 104*e*). If it is determined, that the path distance between the third communication device (e.g., 104*f*) and the sixth communication device (e.g., 104*e*) is less than the previous value of the minimum predefined path distance associated with the sixth communication device (e.g., 104*e*), the processor 202 may update the minimum predefined path distance with the value of the path distance.

A person having ordinary skill in the art will understand that the previous value of the minimum predefined path distance may correspond to a path distance between the second communication device (e.g., 104*c*) and the sixth communication device (e.g., 104*e*). Hence, the updated value of the minimum predefined path distance may correspond to the path distance between the third communication device (e.g., 104*f*) and the sixth communication device (e.g., 106*e*) when this path distance is less than the path distance between the second communication device (e.g., 104*c*) and the sixth communication device (e.g., 104*e*).

At step 506, a check is performed to determine whether the sixth communication device (e.g., 104*e*) belongs to the first set of communication devices. In an embodiment, the processor 202 is configured to perform the check, in a manner similar to that described in supra. If it is determined that the sixth communication device (e.g., 104*e*) belongs to the first set of communication devices, the processor 202 performs step 508, otherwise, the processor 202 performs step 510.

At step 508, the sixth communication device (e.g., 104e) is removed from the first set of communication devices based on the updation of the minimum predefined path distance associated with the sixth communication device (e.g., 104e). In an embodiment, the processor 202 is configured to remove the sixth communication device (e.g., 104e) from the first set of communication devices if the minimum predefined path distance of the sixth communication device (e.g., 104e) is updated with the value of the path distance between the third communication device (e.g., 104f) and the sixth communication device (e.g., 104e) at the step 504.

Thereafter, the processor 202 may iterate the steps 502 through 508 for each of the remaining communication devices in the second path-union graph, having an incoming edge from another communication device in the second path union-graph, in a manner similar to that described for the sixth communication device (e.g., 104e) in supra.

At step 510, the reachability tree is updated by adding the one or more edges in the second path-union graph to the reachability tree. In an embodiment, the processor 202 is configured to update the reachability tree by adding the one or more edges in the second path-union graph to the reachability tree. A person skilled in the art will appreciate that the second path-union graph may include at least one path (if any exists) between the first communication device (e.g., 104a) and the third communication device (e.g., 104f). Further, the at least one path may have a length of less than the predefined path distance. Hence, when the one or more edges of the second path-union graph are added to the reachability tree, the at least one path (if any exists) between the first communication device (e.g., 104a) and the third communication device (e.g., 104f) may be added to the reachability tree.

In an embodiment, the processor 202 may use the updated reachability tree to determine a reachability of a communication device in the communication network 106 from the first communication device (e.g., 104a). A person skilled in the art will understand that the reachability tree may also be used to determine a shortest distance between one or more communication devices (e.g., 104a-104i) in the communication network 106. Further, the reachability tree may be used to determine a shortest path from the first communication device (e.g., 104a) to the other communication devices in the communication network 106.

Figure 6:
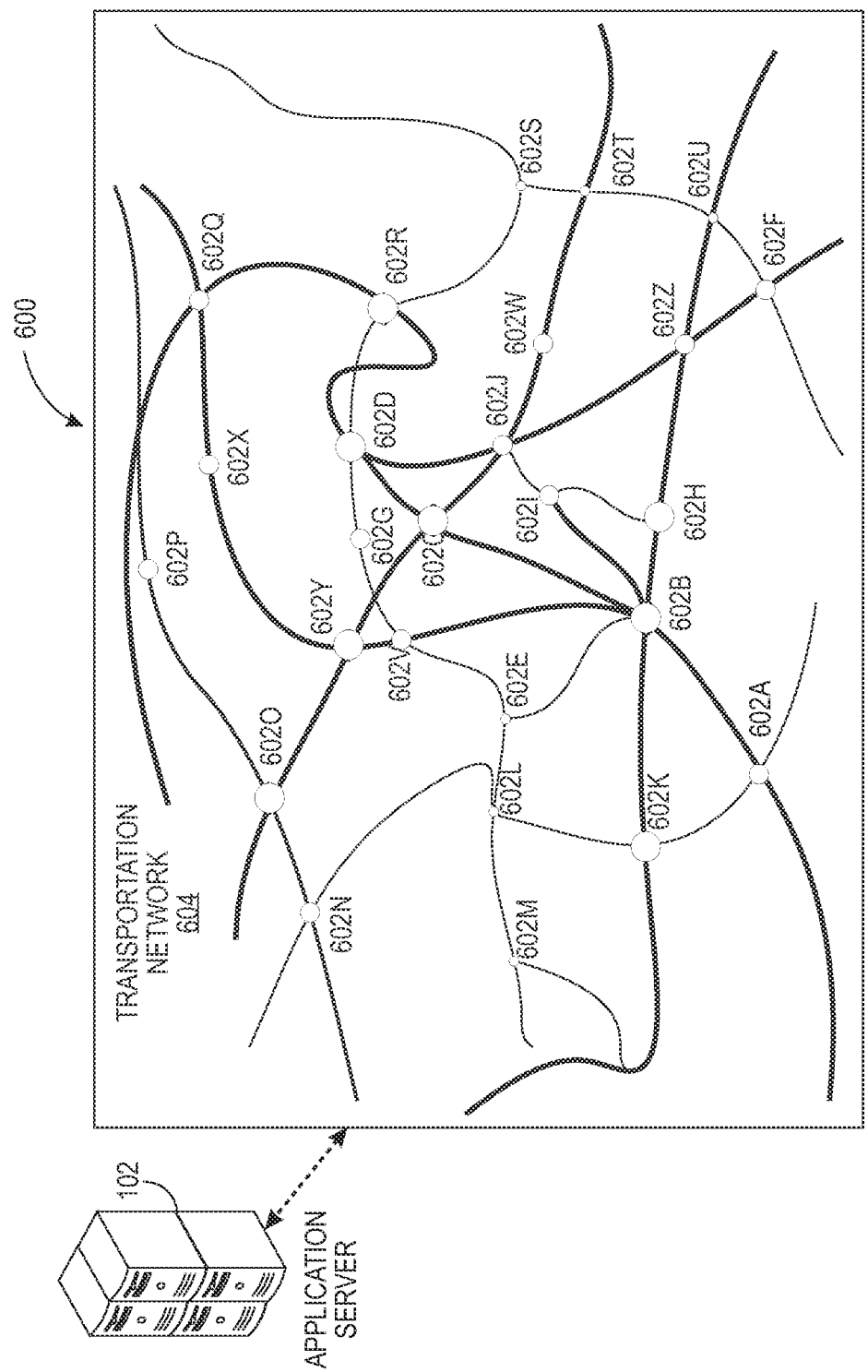
FIG. 6 is a block diagram of another system environment, in which various embodiments can be implemented.

FIG. 6 is a block diagram of another system environment 600, in which various embodiments can be implemented. The system environment 600 includes the application server 102 and a transportation network 604. In an embodiment, the transportation network 604 may include one or more locations (602a-602z) of a geographical area, connected through one or more paths.

The application server 102 refers to a computing device including one or more processors and one or more memories. The one or more memories may include computer readable code that is executable by the one or more processors to perform predetermined operation. In an embodiment, the predetermined operation may include maintaining a reachability information among the one or more locations (e.g., 602a-602z) of the transportation network 604. In an embodiment, at a first time instance, the application server 102 may create a first path-union graph between a first location (e.g., 602a) and a second location (e.g., 602c). The first time instance may correspond to a time instance when the first location (e.g., 602a) becomes unreachable from the second location (e.g., 602c) in the transportation network 604. Thereafter, the application server 102 may create a reachability tree from the first path-union graph. In an embodiment, the reachability tree may be deterministic of a path distance between the first location (e.g., 602a) and a set of locations in the transportation network 604 such that a path distance of each location in the set of locations is less than a predefined path distance. Further, the reachability tree may be deterministic of a reachability information between the first location (e.g., 602a) and the set of locations. In an embodiment, the reachability tree may correspond to a Breadth First Search (BFS) tree on the first path-union graph with the first location (e.g., 602a) as its root node. Further, in an embodiment, a number of levels within the BFS tree corresponding to the reachability tree may be equal to the predefined path distance. An embodiment of a method for creation of the reachability tree for the transportation network 604 has been further explained in conjunction with FIG. 7.

Thereafter, at a third time instance after the first time instance, the application server 102 may update the reachability tree based on a blockage or an unavailability of connectivity between a pair of locations in the transportation network 604. Further, at a second time instance after the third time instance, when a third location (e.g., 602f) becomes unreachable from the first location (e.g., 602a), the application server 102 may create a second path-union graph between the first location (e.g., 602a) and the third location (e.g., 602f). Thereafter, the application server 102 may update the reachability tree based on the second path-union graph. An embodiment of a method of maintaining reachability information among the one or more locations (e.g., 602a-602z) in the transportation network 604 has been explained further in conjunction with FIG. 7.

The application server 102 may be realized through various types of application servers such as, but not limited to, a Java application server, a .NET framework application server, a Base4 application server, a PHP framework application server, or any other application server framework.

The transportation network 604 refers to a network including connectivity information pertaining to the one or more locations (e.g., 602a-602z) in the geographical area. In an embodiment, the connectivity information associated with the one or more locations (e.g., 602a-602z) may be obtained from various sources. In an embodiment, the application server 102 may collect the connectivity information associated with the one or more locations (e.g., 602a-602z) from such sources and maintain such information in the form of a graph data structure (e.g., a connectivity graph). For instance, the application server 102 may receive information pertaining to a map of the geographical area in which the one or more locations (e.g., 602a-602z) are present, from one or more online map databases (e.g., Google Maps™). Thereafter, the application server 102 may determine the information pertaining to the connectivity of the one or more locations (e.g., 602a-602z) based on the information pertaining to the map of the geographical area. A person skilled in the art will understand that such information may be static. Hence, the application server 102 may obtain dynamic connectivity information in real-time from one or more computing devices installed on one or more vehicles travelling on the one or more paths connecting the one or more locations (e.g., 602a-602z). In an embodiment, the one or more computing devices associated with (or installed on) one or more vehicles may send their location co-ordinates to the application server 102 in real-time.

Based on such real-time location co-ordinates, the application server 102 may update the information pertaining to connectivity of the one or more locations (e.g., 602a-602z). For instance, if a large number of vehicles are stuck on a path, there may be a blockage on the path, and hence may indicate a loss of connectivity between the locations connected by the path.

A person skilled in the art will appreciate that the scope of the disclosure should not be limited to the techniques of maintaining the connectivity information, as mentioned above. Various other techniques may be used for maintaining the connectivity information without departing from the spirit of the disclosure.

A person skilled in the art will understand that the application server 102 of the system environment 200 may be similar to the application server 102 of the system environment 100, as explained in conjunction with FIG. 2. For instance, the application server 102 may include the processor 202, the memory 204, the transceiver 206, the comparator 208, the input device 210, the display device 212, the input terminal 214, and the output terminal 216. Further, the processor 202 may be coupled to the memory 204, the transceiver 206, the comparator 208, the input device 210, and the display device 212. However, the transceiver 206 may be connected to the transportation network 204 (instead of, or in addition to, the communication network 106) through the input terminal 214 and the output terminal 216. The transceiver 206 may receive/transmit information pertaining to the transportation network 204 through the input terminal 214 and the output terminal 216, respectively. For instance, through the input terminal 214, the transceiver 206 may receive an information indicative of a blockage/loss of connectivity between locations in the transportation network 204. The one or more computing devices installed on one or more vehicles travelling in the transportation network 204 may transmit such information to the transceiver 206.

Figure 7:
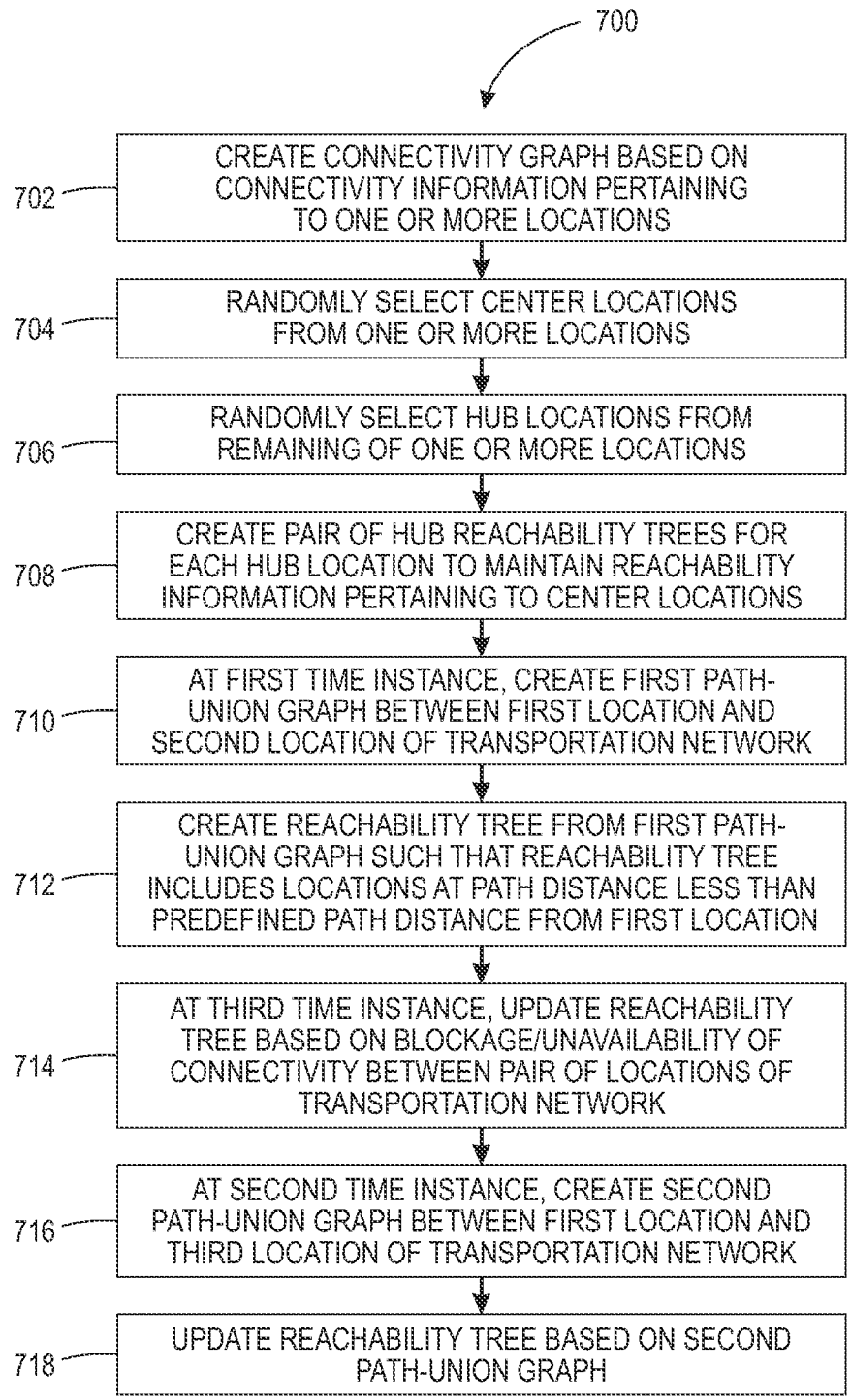
FIG. 7 depicts a flowchart illustrating a method for maintaining a reachability information among one or more locations associated with a transportation network of a geographical area, in accordance with at least one embodiment.

FIG. 7 depicts a flowchart 700 illustrating a method for maintaining a reachability information among the one or more locations (e.g., 602a-602z) associated with the transportation network 604 of the geographical area, in accordance with at least one embodiment. The flowchart 700 has been described in conjunction with FIG. 3 and FIG. 6.

At step 702, a connectivity graph ($G_T$) associated with the one or more locations (e.g., 602a-602z) in the transportation network 204 is created. In an embodiment, the processor 202 is configured to create the connectivity graph $G_T$. In an embodiment, the connectivity graph $G_T$ may representing a connectivity information associated with the one or more locations (e.g., 602a-602z) of the transportation network 604. As discussed in supra (refer FIG. 6), the processor 202 may obtain information pertaining to the map of the geographical area in which the one or more locations are present, from one or more online mapping databases (e.g., Google Maps™). The information pertaining to the map of the geographical area may include connectivity information pertaining to the one or more locations (e.g., 602a-602z), which may be static in nature. Further, in an embodiment, the processor 202 may collect dynamic connectivity information associated with the one or more locations (e.g., 602a-602z) in the transportation network 604. To that end, the processor 202 may periodically receive location co-ordinates of the one or more vehicles from one or more computing devices associated with (or installed on) the one or more vehicles. Based on the location co-ordinates of the one or more vehicles, the processor 202 may determine the dynamic connectivity information pertaining to the one or more locations (e.g., 602a-602z). For instance, if a large number of vehicles are stuck on a path, there may be a blockage on the path, and hence this may indicate a loss of connectivity between the locations connected by the path. Thus, the processor 202 may create and maintain the connectivity graph $G_T$ based on the information pertaining to the map of the geographical area and the location information collected periodically from the one or more vehicles.

A person skilled in the art will understand that the connectivity graph $G_T$, representing the connectivity information pertaining to the one or more locations (e.g., 602a-602z), may be a directed graph. In an embodiment, the direction of an edge between two nodes (representing a pair of locations) in the connectivity graph $G_T$ may be indicative of a direction in which commutation may be permissible/possible between the respective locations in the transportation network 604.

At step 704, center locations are selected from the one or more locations (e.g., 602a-602z). In an embodiment, the processor 202 is configured to randomly select Ö(c) center locations from the one or more locations (e.g., 602a-602z). Further, the processor 202 may create a center graph $C(G_T)$, which includes the Ö(c) center devices. The processor 202 may perform the step 704 in a manner similar to that described in supra (step 304 of FIG. 3).

At step 706, hub locations are selected from remaining of the one or more locations (e.g., 602a-602z). In an embodiment, the processor 202 is configured to randomly select Ö(b) hub locations from remaining of the one or more locations (e.g., 602a-602z). The processor 202 may perform the step 706 in a manner similar to that described in supra (step 306 of FIG. 3).

At step 708, a pair of hub reachability trees are created for each hub location $h_i$. In an embodiment, the processor 202 is configured to create the pair of hub reachability trees for each hub location $h_i$. The processor 202 may perform the step 708 in a manner similar to that described in supra (step 308 of FIG. 3). In an embodiment, the processor 202 may maintain information pertaining to reachability of various center locations through the hub locations using the pair of hub reachability trees of the respective hub locations, in a manner similar to that described in supra.

At step 710, a first path-union graph is created between a first location (e.g., 602a) and a second location (e.g., 602c) of the transportation network 604. In an embodiment, the processor 202 is configured to create the first path union-graph between the first location (e.g., 602a) and the second location (e.g., 602c). In an embodiment, the processor 202 may perform the step 710 at a first time instance when the first location (e.g., 602a) becomes unreachable from the second location (e.g., 602c). A person skilled in the art will understand that the first location (e.g., 602a) and the second location (e.g., 602c) may correspond to center locations. Further, the unreachability of the first location (e.g., 602a) from the second location (e.g., 602c) may correspond to an unreachability of either of the locations from a hub location (e.g., 602b) through which they were connected before the first time instance. Once the first location (e.g., 602a) becomes unreachable from the second location (e.g., 602c) at the first time instance, the processor 202 may create the first path-union graph based on the connectivity graph $G_T$ and a transform/inverse of the connectivity graph $G_T'$, in a manner similar to that described in supra (step 310 of FIG. 3).

At step 712, a reachability tree is created from the first path-union graph. In an embodiment, the processor 202 is configured to create the reachability tree from the first path-union graph such that the reachability tree includes a set of locations in the first path-union graph, which are at a distance of less than a predefined path distance from the first location (e.g., 602a). In an embodiment, the predefined path distance may correspond to a ratio of a count of the one or more locations and a count of the center locations. Further, in an embodiment, the reachability tree may correspond to a BFS tree created on the first path-union graph with the first location as its root node. The processor 202 may perform the step 712 in a manner similar to that discussed in supra (step 312 of FIG. 3).

At step 714, the reachability tree is updated based on a blockage/unavailability of connectivity between a pair of locations in the transportation network 604. In an embodiment, the processor 202 is configured to perform the step 714 at a third time instance, after the first time instance. The third time instance may correspond to a time instance when a connectivity between the pair of locations becomes breaks (e.g., due to blockage of a path connecting the locations). For instance, at the third time instance, in a large number of vehicles may be stuck (e.g., they may move slowly due to traffic congestion or blockage/barrier in the path) while travelling on the path connecting the two locations. The processor 202 may receive an information indicative of the blockage of the path connecting the pair of locations from the one or more computing devices associated with (or installed on) these vehicles. Based on the received information, the processor 202 may determine that the connectivity between the pair of locations has become unavailable or blocked. In an embodiment, the processor 202 may update the reachability tree based on the unavailability of the connectivity between the pair of locations, in a manner similar to that described in supra (step 314 of FIG. 3 and the flowchart 314 of FIG. 4).

At step 716, a second path-union graph is created between the first location (e.g., 602a) and a third location (e.g., 602f) in the transportation network 604. In an embodiment, the processor 202 is configured to perform the step 716 at a second time instance, after the third time instance, when the third location (e.g., 602f) becomes unreachable from the first location (e.g., 602a). In an embodiment, the third location (e.g., 602f) may correspond to a center location. A person skilled in the art will understand that the unreachability of the third location (e.g., 602f) from the first location (e.g., 602a) may correspond to either of the locations becoming unreachable from the hub location (e.g., 602b) through which they were connected before the second time instance. In an embodiment, the processor 202 may create the second path-union graph, in a manner similar to that described in supra (step 316 of FIG. 3).

At step 718, the reachability graph is updated based on the second path-union graph. In an embodiment, the processor 202 is configured to update the reachability tree based on the second path-union graph, in a manner similar to that described in supra (step 318 of FIG. 3 and the flowchart 318 of FIG. 5).

A person skilled in the art will appreciate that the scope of the disclosure should not be limited to maintaining reachability information between one or more communication devices in a communication network or maintaining reachability information between one or more locations in a transportation network. In an embodiment, the disclosure may be implemented in various other scenarios without departing from the spirit of the disclosure.

In an embodiment, the disclosure may be implemented for analysis of influence maximization in a dynamic social network of one or more individuals. For instance, the dynamic social network may include one or more individuals that are connected on social media platforms such as, but not limited to, social networking websites (e.g., Facebook™, Twitter™, LinkedIn™, Google+™, and so forth), web-blogs, web-forums, community portals, online communities, or online interest groups. Each individual may have a varying degree of influence on other individuals connected to him/her by virtue of their common interests, acquaintance, friendship, relationship, or otherwise. The disclosure may be useful in analyzing such degree of influence among the one or more individuals. For instance, the disclosure may be used to determine individuals who may be reachable from a given individual, or individuals who at a predefined distance from the given individual (in the social network), based on the degree of influence of the given individual. If the number of individuals reachable from the given individual or at the predefined distance from the given individual is greater than a threshold, then the given individual may have a high degree of influence. Such influential individuals may be approached by an organization for targeted marketing of their products/services. For instance, viral marketing of products/services may be conducted by posting content to such individuals on the social media platforms.

Further, in an embodiment, the disclosure may be implemented in big data analysis for analyzing complex data represented through graphical data structures. In such a scenario, the disclosure may be used to determine reachability information, shortest path, and shortest distance between any two nodes of the graphical data structures associated with big data analysis. For instance, considering a use case of big data analysis implementation involving a telephone network with customer data records (CDR). The CDR can be used to construct a graphical data structure such that the graphical data structure is representative of a relationship between customers. Further, a degree of influence may be determined between the customers based on a distance between the customers within the graph. For instance, customers within a predefined distance from one another may have a significant influence on one another. The graph may be dynamic and change with time. The disclosure may be implemented to maintain information pertaining to customers having a high degree of influence based on reachability between customers. Such highly influential customers may then be sent targeted marketing content.

The disclosed embodiments encompass numerous advantages. The disclosure provides for determining reachability between one or more nodes in a graph. For instance, as discussed in supra, the reachability information among the one or more communication devices (e.g., 104a-104i) in the communication network 106 may be maintained by the application server 102. To maintain the reachability information, initially, the application server 102 creates the connectivity graph G representative of the connectivity information pertaining to the one or more communication devices (e.g., 104a-104i). Thereafter, the application server 102 randomly selects the Ö(c) center devices and creates the center graph C(G) to maintain the connectivity information between the center devices such that a center device is connected to another center device in C(G) if a path of less than the predefined path distance exists in the connectivity graph G. In addition, the application server 102 randomly selects the Ö(b) hub devices from the one or more communication devices (e.g., 104a-104i). Further, the application server 102 creates the pair of hub reachability trees from each hub device h based on the connectivity graph G and the transpose/inverse of the connectivity graph G'. Thereafter, the application server 102 maintains reachability information between each pair of center devices (e.g., c1, c2) through each hub device h based on the pair of hub reachability trees of the hub device h, as discussed in supra. Thus, the problem of maintaining reachability information among the one or more communication devices (e.g., 104a-104i) reduces to maintaining reachability information among the Ö(c) center devices based on the hub reachability trees. This may lead to a reduction in complexity of the problem by a factor of Ö(c).

Further, when at the first time instance, the first communication device (a center device, e.g., 104a) becomes unreachable from the second communication device (another center device, e.g., 104c) through the hub device (e.g., 104b) through which they were earlier connected, the application server 102 creates the first path-union graph, as discussed in supra. The first path-union graph may include a path of less than the predefined path distance, between the first communication device (e.g., 104a) and the second communication device (e.g., 104c). Thereafter, the application server 102 creates the reachability tree from the first path-union graph with the first communication device (e.g., 104a) as its root node. Further, when at the second time instance, the first communication device (a center device, e.g., 104a) becomes unreachable from the third communication device (another center device, e.g., 104f) through the hub device (e.g., 104b) through which they were earlier connected, the application server 102 creates the second path-union graph in a manner similar to the creation of the first path-union graph, as discussed in supra. Thereafter, the application server 102 may update the reachability tree based on the second path-union graph, as described in supra. Thus, the reachability information pertaining to the first communication device (e.g., 104a) may be maintained using a single reachability tree, and a fresh reachability tree need not be created when another center device becomes unreachable from the first communication device (e.g., 104a). This further may further lead to a reduction in complexity of the problem by a factor of Ö(c).

Further, when at the third time instance (between the first and the second time instances), the pair of communication devices in the communication network 106 become unconnected; the application server 102 accordingly updates the reachability tree, as discussed in supra. The updation of the reachability tree at this stage helps in maintains reachability information in the reachability tree based on dynamic edge deletions in the connectivity graph G (i.e., for communication devices other than the center devices).

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system.

The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for determining reachability between one or more nodes in a graph have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. An application server for determining a shortest communication path between one or more communication devices of a communication network, the application server comprising one or more processors configured to:
   randomly select one of more center communication devices from the one or more communication devices,
   generate a center graph comprising an edge between a first communication device of the one or more center communication devices and a second communication device of the one or more center communication devices, wherein a first path distance between the first communication device and the second communication device is less than a first predefined path distance, the first predefined path distance corresponding to a ratio of a count of the one or more communication devices and a count of the one or more center communication devices;
   randomly select one or more hub devices from a remaining one or more communication devices;
   generate a pair of hub reachability trees for each of the one or more hub devices;
   determine a reachability of each of the first and second communication devices through at least one hub device using the pair of hub reachability trees corresponding to the at least one hub device;
   determine whether the first communication device is reachable from the second communication device and a third communication device in said communication network;
   create, at a first time instance, a first path-union graph, between said first communication device and said second communication device, when said second communication device and said first communication device are unreachable in said communication network;
   create a reachability tree from said first path-union graph, wherein said reachability tree is deterministic of a path distance between said first communication device and a set of communication devices in said communication network, wherein said path distance is less than the predefined path distance, and wherein said reachability tree is deterministic of said reachability information between said first communication device and said set of communication devices;
   create, at a second time instance, a second path-union graph between said first communication device and said third communication device, when said third communication device is unreachable from said first communication device;
   update said reachability tree based on said second path-union graph;
   based on the updated reachability tree, determine a shortest communication path from the first communication device to each of the second and third communication devices.

2. The application server of claim 1, wherein said one or more processors are further configured to receive, at a third time instance, an information pertaining to a failure of a communication link between a pair of communication devices in said communication network, wherein said third time instance is between said first time instance and said second time instance.

3. The application server of claim 2, wherein said one or more processors are further configured to determine, from said reachability tree, whether a fourth communication device from said pair of communication devices is at a distance greater than said predefined path distance from said first communication device.

4. The application server of claim 3, wherein said one or more processors are further configured to determine whether said fourth communication device belongs to a first set of communication devices in said communication network.

5. The application server of claim 4, wherein each communication device in said first set of communication devices is at a distance greater than a second predefined path distance from said first communication device, wherein said second predefined path distance corresponds to a difference between said predefined path distance and a minimum predefined path distance associated with said each communication device.

6. The application server of claim 5, wherein said minimum predefined path distance associated with a communication device corresponds to a minimum path distance of said communication device from at least said second communication device.

7. The application server of claim 5, wherein said one or more processors are further configured to identify a fifth communication device connected to said fourth communication device, such that said fifth communication device is at a level preceding said fourth communication device within said reachability tree.

8. The application server of claim 7, wherein said one or more processors are further configured to add an edge between said fifth communication device and said fourth communication device to said reachability tree based on said fifth communication device not belonging to said first set of communication devices.

9. The application server of claim 5, wherein said one or more processors are further configured to add adding said fourth communication device to said first set of communication devices based on a level of said fourth communication device in said reachability tree, said predefined path distance, and said minimum predefined path distance associated with said fourth communication device.

10. The application server of claim 9, wherein said one or more processors are further configured to remove an edge between said fourth communication device and another communication device in said reachability tree, based on said addition of said fourth communication device to said first set of communication devices.

11. The application server of claim 5, wherein said one or more processors are further configured to determine, from said second path-union graph, a path distance between said third communication device and a sixth communication device in said second path-union graph.

12. The application server of claim 11, wherein to update said reachability tree, said one or more processors are further configured to update said reachability tree further comprises updating said minimum predefined path distance associated with said sixth communication device based on said path distance between said third communication device and said sixth communication device.

13. The application server of claim 12, wherein said one or more processors are further configured to remove said sixth communication device from said first set of communication devices, when said sixth communication device belongs to said first set of communication devices, based on said updating of said minimum predefined path distance associated with said sixth communication device.

* * * * *